United States Patent
Lei

(10) Patent No.: US 10,979,877 B2
(45) Date of Patent: Apr. 13, 2021

(54) VEHICLE APPLICATION TRIGGERED NETWORK SELECTION OF TELEMATICS DEVICE SYSTEM

(71) Applicant: Ford Global Technologies, LLC, Dearborn, MI (US)

(72) Inventor: Oliver Lei, Windsor (CA)

(73) Assignee: Ford Global Technologies, LLC, Dearborn, MI (US)

(*) Notice: Subject to any disclaimer, the term of this patent is extended or adjusted under 35 U.S.C. 154(b) by 395 days.

(21) Appl. No.: 15/903,735

(22) Filed: Feb. 23, 2018

(65) Prior Publication Data

US 2019/0268740 A1   Aug. 29, 2019

(51) Int. Cl.
| | |
|---|---|
| *H04W 4/44* | (2018.01) |
| *H04W 4/70* | (2018.01) |
| *G07C 5/00* | (2006.01) |
| *H04W 4/60* | (2018.01) |

(52) U.S. Cl.
CPC ............. *H04W 4/44* (2018.02); *G07C 5/008* (2013.01); *H04W 4/60* (2018.02); *H04W 4/70* (2018.02)

(58) Field of Classification Search
None
See application file for complete search history.

(56) References Cited

U.S. PATENT DOCUMENTS

| | | | |
|---|---|---|---|
| 8,335,506 B2 | 12/2012 | Krause et al. | |
| 8,428,598 B2 | 4/2013 | Lee | |
| 9,445,324 B2 | 9/2016 | Kmirijoo et al. | |
| 9,622,120 B2 | 4/2017 | Mueck et al. | |
| 2006/0211446 A1* | 9/2006 | Wittmann | G08G 1/09 455/552.1 |
| 2014/0199989 A1* | 7/2014 | Cepuran | H04W 48/16 455/422.1 |
| 2016/0295470 A1 | 10/2016 | Timms et al. | |
| 2017/0041976 A1* | 2/2017 | Van | H04W 48/18 |
| 2019/0028946 A1* | 1/2019 | Gandhi | H04W 48/06 |

* cited by examiner

*Primary Examiner* — Thomas G Black
*Assistant Examiner* — Ana D Thomas
(74) *Attorney, Agent, or Firm* — Michael Spenner; Brooks Kushman P.C.

(57) ABSTRACT

A vehicle network selection system may include a vehicle modem configured via rules to connect with a first network but not a second network; and a telematics controller programmed to receive data via the first network at a current throughput, receive an application request from a vehicle application requiring a minimum throughput to perform the request, instruct the modem, in response to the current throughput below the minimum throughput, to enter into an override mode to connect to the second network capable of meeting the minimum throughput.

11 Claims, 3 Drawing Sheets

US 10,979,877 B2

VEHICLE APPLICATION TRIGGERED NETWORK SELECTION OF TELEMATICS DEVICE SYSTEM

TECHNICAL FIELD

Disclosed herein are vehicle application triggered network selection of telematics device systems.

BACKGROUND

Vehicles often connect to wireless networks to facilitate data exchange between the vehicle and a remote server. These networks are often cellular networks with which the user or driver has a contractual relationship. However, many of these cellular networks have limits as to the amount of throughput that each may provide, especially when a vehicle is at or near an edge of a service area of the network.

SUMMARY

A vehicle network selection system may include a vehicle modem configured via rules to connect with a first network but not a second network; and a telematics controller programmed to receive data via the first network at a current throughput, receive an application request from a vehicle application requiring a minimum throughput to perform the request, instruct the modem, in response to the current throughput below the minimum throughput, to enter into an override mode to connect to the second network capable of meeting the minimum throughput.

A method for selecting a vehicle network may include receiving data via a first network at a current throughput, receiving an application request from a vehicle application requiring a minimum throughput to perform the application request, and instructing, in response to the minimum throughput exceeding the current throughput, a vehicle modem to enter into an override mode to connect to a second network capable of meeting the request throughput.

A vehicle network selection system may include a vehicle modem configured to connect with a first network; and a telematics controller configured to: receive data via the first network at a current throughput, receive an application request from a vehicle application requiring a minimum throughput in order to perform the application request, determining whether the current throughput exceeds the minimum throughput, instructing the modem to enter into an override mode to search for other available networks capable of meeting the request throughput, receiving, in response to the search, at least one second network configured to provide wireless communication under a plurality of protocols, prioritizing the protocols based on a protocol throughput of each protocol, selecting a network having the protocol with the highest throughput, and instructing the modem to connect with the selected network.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a network selection system where the telematics server allows a vehicle modem to enter into an override mode to allow the modem to connect to networks not typically permitted under various subscriber identity module (SIM) card rules.

Figure 1:
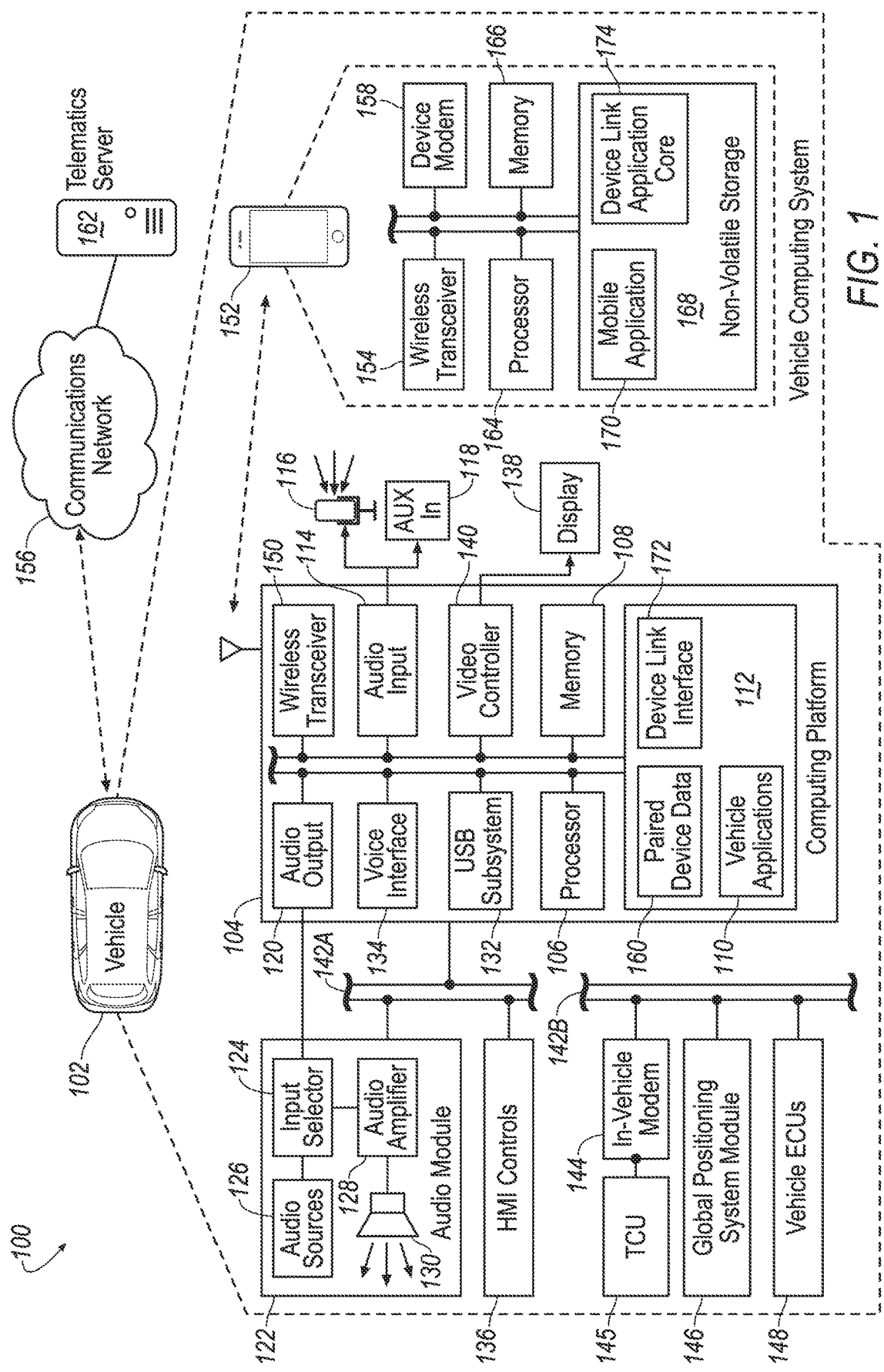
FIG. 1 illustrates an example diagram of a system configured to provide telematics services to a vehicle.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include a memory 108 and one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. These instructions may include execution of a network selection system 200 as described in more detail with respect to FIG. 2 below. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices.

The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a standard grammar describing available command functions, and voice prompt generation for output via the audio module 122. The voice interface 134 may utilize probabilistic voice recognition techniques using the standard grammar 176 in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to communicate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, telematics control unit (TCU) 145, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142. Although individually shown in FIG. 1, the TCU 145 may include the vehicle modem 144, as explained with respect to FIG. 2.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples, the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. As discussed in more detail with respect to FIG. 2, a first network 202 and a second network 208 may provide communication services to the mobile devices 152 and vehicle 102.

To facilitate the communications over the communications network 156 mobile devices 152 may be associated with unique device identifiers (e.g., mobile directory numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote server 162 or other remote computing device. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote server 162 or other network services via the device modem 158.

For instance, the computing platform 104 may include a device link interface 172 to facilitate the integration of functionality of the mobile applications 170 configured to communicate with a device link application core 174 executed by the mobile device 152. In some examples, the mobile applications 170 that support communication with the device link interface 172 may statically link to or otherwise incorporate the functionality of the device link application core 174 into the binary of the mobile application 170. In other examples, the mobile applications 170 that support communication with the device link interface 172 may access an application programming interface (API) of a shared or separate device link application core 174 to facilitate communication with the device link interface 172.

The integration of functionality provided by the device link interface may include, as an example, the ability of mobile applications 170 executed by the mobile device 152 to incorporate additional voice commands into the grammar of commands available via the voice interface 134. The device link interface 172 may also provide the mobile applications 170 with access to vehicle information available to the computing platform 104 via the in-vehicle networks 142. An example of a device link interface 172 may be the SYNC APPLINK component of the SYNC system provided by the Ford Motor Company of Dearborn, Mich. Other examples of device link interfaces 172 may include MIRRORLINK, APPLE CARPLAY, and ANDROID AUTO.

Figure 2:
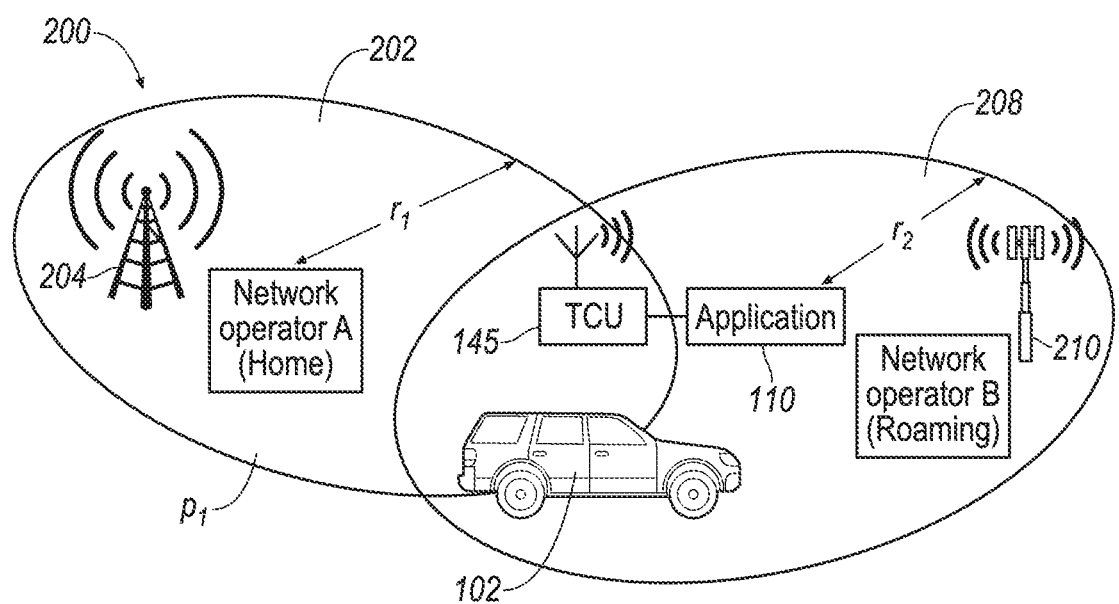
FIG. 2 illustrates an example diagram of a network selection system.

FIG. 2 illustrates an example network selection system 200. The network selection system 200 may provide for selection between at least a first network 202 and a second network 208. A first tower 204 may be an antenna at a cellular telephone site. The first tower 204 may be a base station to provide a global system for mobile communications (GMS) network for a specific service provider (e.g., VERIZON, AT&T, T-MOBILE, etc.). The specific service provider may be a first service provider having a contractual relationship with the driver or user of the vehicle 102. The in-vehicle modem 144 (shown in FIG. 1) of the telematics controller 145 may be registered with the first service provider wherein the first service provider provides service to the vehicle 102 due to the contractual relationship. The contractual relationship may be defined on a SIM card within the vehicle 102 or the mobile device 154. The SIM card may include an international mobile subscriber identity (IMSI) number and one or more keys. These identifiers are used to identify and authenticate subscribers and to define set of rules that indicate which networks and what type of protocols the vehicle 102 may connect to. The SIM card may identify a list of services that the user has access to, a personal identification number (PIN), a personal unlocking code (PUC), authentication key (Ki), local area identity (LAI) and operator-Specific emergency number, among other information. The SIM card may also include and store provider data such as the SMSC (Short Message Service Center) number, Service Provider Name (SPN), Service Dialing Numbers (SDN), Advice-Of-Charge parameters and Value Added Service (VAS) applications. The telematics controller 145 may include the vehicle modem 144 (shown in FIG. 1) and may prevent the vehicle from connecting to networks other than the first network 202 based on rules established on the SIM card. The rules may be stored on the SIM card itself or within the memory 108 (shown in FIG. 1).

The second network 208 may be a network provided by a service provider other than the first service provider (i.e., by a second service provider). Service over the second network 208 may be provided by a second tower 210, corresponding to the second service provider than that of the first network 202. The second service provider may be a provider which has no contractual relationship with the user, but has roaming agreement with the first network provider. Thus, should the mobile device 152 or vehicle 102 connect to the second network 204, the user may incur roaming charges. The second network 208 may provide similar connectivity and services to the first network 202.

The first network 202 and second network 208 may facilitate communication with the vehicle 102 via the communication network 156 (shown in FIG. 1). The first network 202 may be a "home" network, or a network provided by the first service provider to which the user subscribes. Generally, telematics systems default to connecting to the first network 202 in order to avoid roaming changes. That is, in this default mode, the first network 202 is provided by a service provider to which the user already has subscribed, and therefore is a preferred network. The second network 208, on the other hand, may not be contractually associated with the user and may result in usage fees should the vehicle 102 connect to the second network 208. The SIM card rules may actively prevent the vehicle modem 144 from connecting with the second network 208 when it is able to connect to the first network 202.

Each of the first network 202 and second network 208 may provide services using radio access technologies (RATs). RATs may include CDMA, GSM, and 3G, 4G, LTE, etc. RAT may also include relatively lower throughput RATs, such as EDGE and UMTS. Each RAT may have different capabilities and connectivity characteristics. These connectivity characteristics may include a throughput permitted under each protocol. Throughput is the maximum rate of successful data delivery over a specific communication channel. For example, the throughput may be a measurement in bits per second (bps) or data packets per second (pps). Certain protocols may permit and facilitate delivery of higher throughput, where others may only permit a limited throughput. Typically, RATs having a lower throughput such as EDGE and UMTS may provide voice only communications. LTE, on the other hand, may be used for a higher throughput packet connection.

The telematics controller 145 of the vehicle 102 may run various vehicle applications 110 such as mapping, navigation, streaming media (both audio and visual), connecting to Wi-Fi hotspots, etc. These vehicle applications 110 may require a certain amount of throughput in order to accommodate the requests made by the vehicle application 110. Upon receiving a request for an application, the telematics controller 145 attempts to accommodate the request by providing data over the first network 202. In some situations, however, the first network 202 may fail to provide enough throughput to accommodate the request. This may typically be the case when the vehicle 102 is traveling outside or near the outside range of the first tower 204. The first tower 204 may provide services for a certain range defined by a first radius $r_1$. Towards an outer perimeter $p_1$ of the first radius $r_1$, a strength of the first network 202 may decline. For example, if the vehicle 102 is on the inside of a predefined distance (e.g., 10 miles) from the outer perimeter, then service provided by the first network 202 may decline in reliability and/or throughput.

The distance of the vehicle 102 relative to the first tower 204 may be determined based on a GPS position of the vehicle with respect to the first tower 204. In this example, the tower 204 may transmit its GPS position to the vehicle 102. The distance of the vehicle 102 from the tower may also be determined by a signal strength between the tower and the vehicle 102.

As the vehicle 102 moves to an area not serviced by the first network 202, i.e., towards the perimeter of the first radius $r_1$, the vehicle modem 144 or device modem 158 may not stay connected with a proper RAT to meet the current vehicle application. For example, toward the perimeter $p_1$, the vehicle 102 may connect to CDMA, but not LTE. The SIM card rules may restrict the modem 144 from connecting to networks other than the first network 202 even though a network (e.g., the second network 208) may be available and provide a higher throughput connection. Because the RAT is at a lower throughput protocol (e.g., CDMA), applications such as WiFi hotspot requests, will fail.

If the first network 202 fails to provide enough packet throughput for a certain requested application, the telematics controller 145 may instruct the modem 144 to switch to a network, such as the second network 208, which may be capable of providing the necessary packet throughput. In order to do this, the modem 144 may need to override the SIM card rules that typically restrict the modem from connecting to networks provided by out of service providers.

To do this, the telematics controller 145 may determine first whether the controller 145 has received a request from an application that would require throughput in excess of that being currently provided by the first network 202. For example, the application may include an audio application requesting music. Typically, music streams may require around 3 Mbps or more in order for the user to appreciate a quality audio stream. Upon receiving a request to stream audio, the telematics controller 145 may compare the required minimum throughput with the current throughput of the first network 202. If the minimum throughput is higher than the current throughput, the telematics controller 145 may determine that the request cannot be fulfilled by the first network 202.

The required minimum throughput may include the throughput required for the specific application making the request for data. Additionally or alternatively, the required minimum throughput may include a sum of existing required throughputs. For example, multiple applications and systems may be in use and running on the vehicle 102. Each of these applications could require a certain amount of throughput. When an application makes a request, the required minimum throughput could include a sum of all existing throughput commitments.

In response to this, the telematics controller 145 may instruct the modem 144 to enter into an override mode. The override mode may allow the modem 144 to search for and connect with other networks, such as the second network 208. By entering into the override mode, the modem 144 diverges from a default operating mode in which connections are limited based on the SIM card rules. The modem 144 may search for available networks, including roaming networks. The discovered networks may then be registered with the modem 144 such that the modem 144 may recognize the networks, each having RATs. Each RAT may include RAT attributes such as speed/throughput, etc.

Once the modem 144 registers the additional networks, the telematics controller 145 may prioritize the RATs of each network based on the RAT attributes such as the throughput. That is, the RATs with the highest throughput would be ranked higher than those with lower throughputs. In one example, LTE may be ranked higher than EVDO/UMTS, while EVDO/UMTS may be ranked higher than CDMA/GSM. Further, a home network of the user may take priority over a non-contractual network where the throughputs of RATs of each network are near equal. For example, the throughput for two similar RATs may within a few kbps to be considered near equal. Further, if both RATs are of the same protocol but the only difference is of which network provides the protocol, the RATs may be considered equal.

In one example the modem 144 may register a first network having a CDMA RAT and a second network having UMTS and CDMA RATs. The prioritization may then be UMTS of the second network, then CDMA of the first network, then CDMA of the second network.

Once the telematics controller 145 has prioritized the RATs of the recognized networks, the telematics controller 145 may select the RAT with the highest prioritization in order to accommodate the application request. In this example, the telematics controller 145 may instruct the modem 144 to connect with the UMTS of the second network, even though the second network 208 may be considered roaming. By allowing the modem 144 to connect to the second network 208 instead of the first network 202, the user may enjoy the application. Some service providers offer flat rate pricing for customers regardless of whether the vehicle 102 is connected to the first home network 202 or a second non-subscription network 208. Thus, roaming costs may be becoming less of a concern for users.

While FIG. 2 illustrates a first network 202 and a second network 208, more networks may be appreciated and prioritized. Multiple service providers may have towers providing service, the radius of service often overlapping with one another. Thus, the telematics controller 145 may prioritize across multiple non-subscribing networks and RATs.

Figure 3:
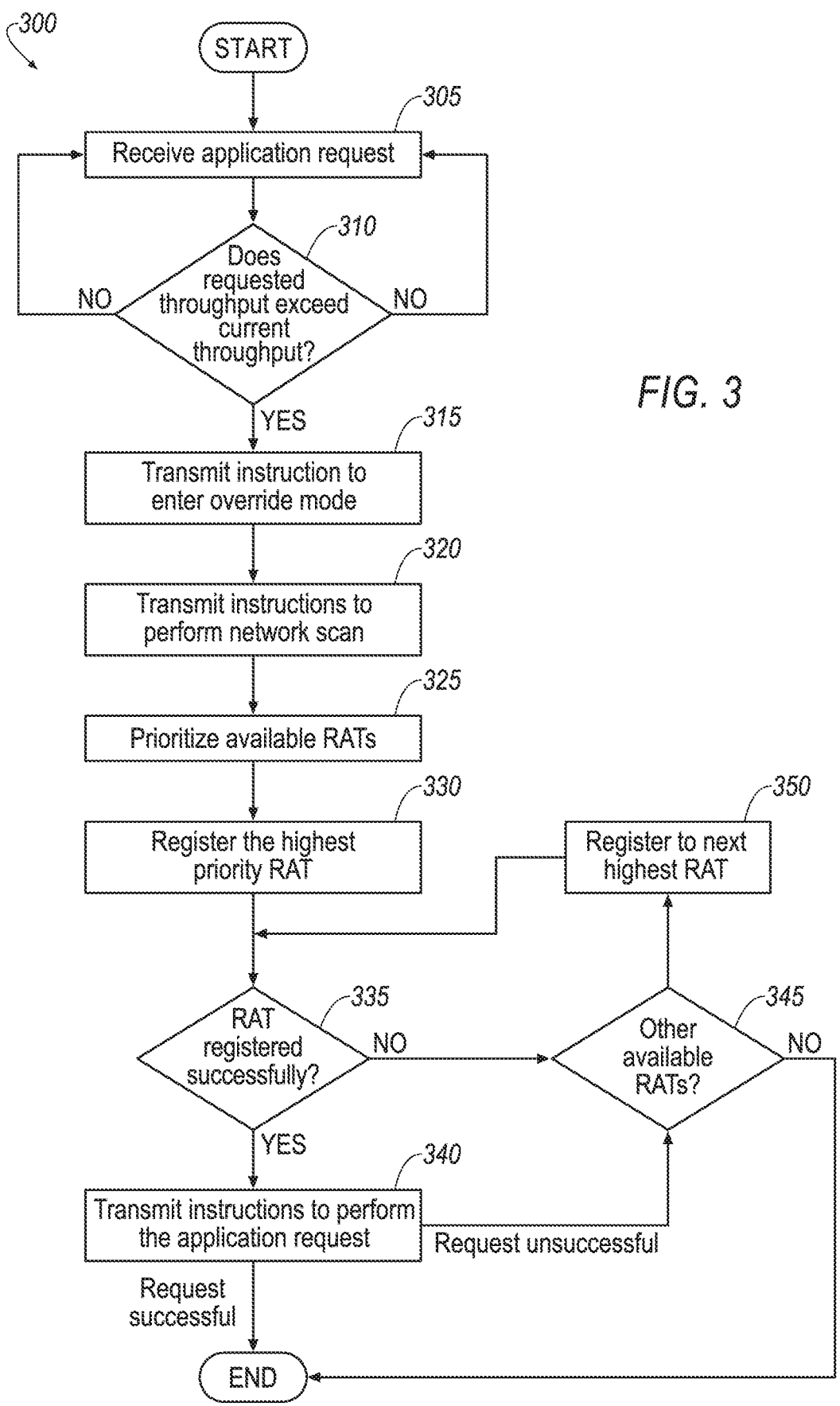
FIG. 3 illustrates an example process for the network selection system.

FIG. 3 illustrates an example process 300 for the network selection system 200. Although the process 300 is described by being performed by a processor of the telematics controller 145 or TCU 145, the process 300 may be performed by any number of other controllers and processors such as the processor 106, computing platform 104, and the in-vehicle modem 144.

The process 300 begins at block 305 where the controller 145 may receive an application request. As explained above, the application request may include a request from an application on the vehicle 102 or mobile device 152. The application may be a navigation application or an audio/infotainment application. The request may include a call for data over the first network 202. The application request may include the requested minimum throughput which indicates the amount of throughput required to accommodate the request.

At block 310, the controller 145 may determine whether the requested throughput exceeds the throughput of the current RAT. If so, the process 300 proceeds to block 315. If not, the process 300 returns to block 305.

At block 315, the controller 145 may instruct the modem 144 to enter into the override mode.

At block 320, the controller 145 may instruct the modem 144 to perform a network scan where the modem 144 may search for networks, such as the second network 208, to which the modem 144 could connect. As explained, each network may include a plurality of RATs, each having various connection characteristics, including throughput.

At block 325, the controller 145 may prioritize the available RATs discovered by the network scan based on the throughput of each RAT. The RAT with the highest throughput may have the highest priority.

At block 330, the controller 145 may instruct the modem 144 to register the highest priority RAT. That is, the modem 144 may connect with the network hosting the highest priority RAT.

At block 335, the controller 145 may determine whether the RAT was registered successfully. In other words, was a connection secured with the network of the selected RAT from block 330. If so, the process 300 proceeds to block 340. If not, the process 300 proceeds to block 245.

At block 340, the controller 145 may transmit instruction to perform the application request. That is, the controller 145 may instruct the modem to transmit the necessary data to perform the application request. If the request was successfully performed, the process 300 proceeds to end. If not, the process proceeds to block 345.

At block 345, the controller 145, in response to an unsuccessfully registered RAT at block 335, or in response to an unsuccessful request at block 340, may determine whether the network scan provided any other available RATs. This may include RATs of different protocol or on a different network. If the controller 145 determines that there are other available RATs, the process 300 proceeds to block 350. If not, the process 300 ends.

Thus, disclosed here in a network selection system configured to connect to a highest priority throughout RAT regardless of by which network the RAT is provided.

Computing devices described herein, such as the computing platform 104, mobile device 152, modem 144, and telematics controller 145, generally include computer-executable instructions where the instructions may be executable by one or more computing devices such as those listed above. Computer-executable instructions, such as those of the virtual network interface application 202 or virtual network mobile application 208, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, Prolog, LISP, Corelet, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle network selection system, comprising:
a vehicle modem configured via rules to connect with a first network but not a second network; and
a telematics controller programmed to
receive data via the first network at a current throughput,
receive an application request from a vehicle application requiring a minimum throughput to perform the request, and
instruct the modem, in response to the current throughput being below the minimum throughput, to enter into an override mode to connect to the second network capable of meeting the minimum throughput, wherein the override mode permits the modem to connect to networks otherwise prohibited by subscriber identity module (SIM) card rules of the vehicle.

2. The system of claim 1, wherein the controller is further programmed to:
instruct the modem to identify a plurality of networks including the first network and the second network, each providing wireless communication capabilities at a plurality of protocols; and
prioritize the protocols based on a protocol throughput of each protocol.

3. The system of claim 2, wherein the controller is further programmed to:
select one of the plurality of protocols as having the highest throughput; and
instruct the modem to connect with the network providing the selected protocol.

4. The system of claim 3, wherein the controller is further programmed to determine whether the selected protocol was registered successfully and instruct the modem to register the protocol with the next highest throughput in response to the selected protocol failing to register successfully.

5. The system of claim 3, wherein the controller is further programmed to determine whether the application request was successfully performed and instruct the modem to register the protocol with the next highest throughput in response to the application request being unsuccessful.

6. A method for selecting a vehicle network, comprising:
receiving data via a first network at a current throughput;
receiving an application request from a vehicle application requiring a minimum throughput to perform the application request; and
instructing, in response to the minimum throughput exceeding the current throughput, a vehicle modem to enter into an override mode to connect to a second network capable of meeting the request throughput, wherein the override mode permits connections to networks otherwise prohibited by subscriber identity module (SIM) card rules of a vehicle.

7. The method of claim 6, further comprising:
identifying the first and second networks as providing wireless communication under a plurality of protocols;
prioritizing the protocols based on a protocol throughput of each protocol.

8. The method of claim 7, further comprising:
selecting a network having the protocol with the highest throughput; and
instructing the modem to connect with the selected network.

9. A vehicle network selection system, comprising:
a vehicle modem configured to connect with a first network; and
a telematics controller configured to:
receive data via the first network at a current throughput,
receive an application request from a vehicle application requiring a minimum throughput in order to perform the application request,
determining whether the current throughput exceeds the minimum throughput,
instructing the modem to enter into an override mode to search for other available networks capable of meeting the request throughput, wherein the override mode permits the modem to connect to networks otherwise prohibited by subscriber identity module (SIM) card rules of the vehicle,
receiving, in response to the search, at least one second network configured to provide wireless communication under a plurality of protocols,
prioritizing the protocols based on a protocol throughput of each protocol,
selecting a network having the protocol with the highest throughput, and
instructing the modem to connect with the selected network.

10. The system of claim 9, wherein the controller is further programmed to determine whether the selected protocol was registered successfully and instruct the modem to register the protocol with the next highest throughput in response to the selected protocol to register successfully.

11. The system of claim 9, wherein the controller is further programmed to determine whether the application request was successfully performed and instruct the modem to register the protocol with the next highest throughput in response to the application request being unsuccessful.

* * * * *